United States Patent
Polepalli

(10) Patent No.: US 9,913,127 B1
(45) Date of Patent: Mar. 6, 2018

(54) PROVISIONING AND CONFIGURATION OF CELLULAR MODEMS

(71) Applicant: Fortinet, Inc., Sunnyvale, CA (US)

(72) Inventor: Shashidhar Reddy Polepalli, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/334,689

(22) Filed: Oct. 26, 2016

(51) Int. Cl.
| | |
|---|---|
| *H04W 8/18* | (2009.01) |
| *H04W 8/22* | (2009.01) |
| *H04W 76/02* | (2009.01) |
| *H04W 88/02* | (2009.01) |
| *H04W 16/06* | (2009.01) |

(52) U.S. Cl.
CPC ............ *H04W 8/183* (2013.01); *H04W 8/22* (2013.01); *H04W 76/021* (2013.01); *H04W 76/025* (2013.01); *H04W 16/06* (2013.01); *H04W 88/02* (2013.01)

(58) Field of Classification Search
CPC ..... H04W 8/265; H04W 12/06; H04W 8/205; H04W 12/08; H04W 8/18; H04W 4/001; H04W 8/245; H04W 12/04; H04W 8/04; H04W 8/06; H04W 60/00; H04W 76/02; H04L 63/0853; H04L 61/6054
See application file for complete search history.

(56) References Cited

U.S. PATENT DOCUMENTS

| | | | | |
|---|---|---|---|---|
| 7,137,003 | B2* | 11/2006 | Krishnan | H04M 17/02 455/410 |
| 9,020,479 | B1* | 4/2015 | Somayajula | H04W 48/18 455/418 |
| 9,408,012 | B2* | 8/2016 | Li | H04W 8/20 |
| 2009/0061934 | A1* | 3/2009 | Hauck | H04W 8/265 455/558 |
| 2014/0051423 | A1* | 2/2014 | Marsden | H04W 4/001 455/419 |

* cited by examiner

*Primary Examiner* — Olumide T Ajibade Akonai
(74) *Attorney, Agent, or Firm* — Hamilton, DeSanctis & Cha LLP

(57) ABSTRACT

Systems and methods for seamless provisioning and configuration of cellular modems of a private network by a provisioning server are provided. A network device detects a SIM card is inserted into a cellular modem of the network device and reads one or more properties of the SIM card from the SIM card. The network device sends the one or more properties of the SIM card to a provisioning server and receives configurations of the cellular modem from the provisioning server and applies the configuration that matches the properties of the SIM card to the cellular modem. The network device activates a connection to a cellular data network through the cellular modem.

24 Claims, 10 Drawing Sheets

| Name | ICCID | IMSI | SIM PIN | Country | Carrier | Firmware | APN Type | User Name | Password | Authentication Type | Billing cycle | Data Usage |
|---|---|---|---|---|---|---|---|---|---|---|---|---|
| SIM_1 | 891xxx | xxxx | xxxx | US | Verizon | V1.0 | Standard | | | | 31-Jan | 10GB |
| SIM_2 | 891xxx | xxxx | xxxx | US | AT&T | V1.0 | Static | | | | 15-Jan | 15GB |
| SIM_3 | 891xxx | xxxx | xxxx | US | Sprint | V3.0 | Private | USER1 | XXX | CHAP | 31-Jan | 20GB |
| SIM_4 | 89xxxx | xxxx | xxxx | GB | vodafone | V1.0 | Standard | | | | 31-Jan | 10GB |
| SIM_5 | 89xxxx | xxxx | xxxx | GB | Sprint | V2.0 | Private | USER2 | XXX | PAP | 31-Jan | 15GB |
| SIM_6 | 891xxx | xxxx | xxxx | US | T-mobile | V4.0 | Private | USER3 | XXX | PAP | 31-Jan | 10GB |

FIG. 10

PROVISIONING AND CONFIGURATION OF CELLULAR MODEMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network security technology. In particular, various embodiments relate to seamless management and configuration of cellular modems of a private network by a provisioning server.

Description of the Related Art

Nowadays, it is crucial for a company to maintain a reliable connection to the Internet without disruption. A private network of a company usually has more than one connection to the Internet so that a failover connection may maintain connectivity to the Internet when a primary Internet connection has failed.

FIG. 1 illustrates a typical prior art network architecture 100 with wireless failover connections. As shown in FIG. 1, network security device 120 has a Local Area Network (LAN) port 124, which is used for connecting a local network. Network security device 120 also has a Wide Area Network (WAN) port 123, which is connected to a cable modem 122 which is usually provided by an Internet Service Provider (ISP). Cable modem 122 is used for connecting the local network to the Internet 150 through the ISP. Network security device 120 also has cellular modems 125 and 126, such as Third Generation (3G)/Fourth Generation (4G)/Long Term Evolution (LTE) modems, as failover connections. Cellular modems 125 and 126 may be in the form of one or more Universal Serial Bus (USB) dongles that are inserted into a USB port of Network security device 120. When the primary Internet connection is lost as a result of a problem with cable modem 122 or the ISP, cellular modem 125 or 126 may connect to the Internet 150 through a wireless data network. To improve the cellular connection, remote wireless adapters have been introduced so that a cellular USB wireless modem may be connected to the network security device remotely. As shown in FIG. 1, remote wireless adapter 110 has cellular modems 112 and 113 and an Ethernet port 111. Remote wireless adapter 110 may be placed at a remote place from network security device 120 where the cellular signal is stronger than the cellular signal observed at the location of network security device 120. Network security device 120 and remote wireless adapter 110 are connected through a cable or a LAN. Remote wireless adapter 110 is another router besides cable modem 122. Internet Protocol (IP) addresses assigned to cellular modems 112 and 113 by cellular network are sent to network security device 120. When the primary Internet connection of cable modem 122 is down, network security device 120 forwards all outgoing traffic to WAN port 121. The outgoing traffic is then forwarded to the Internet through cellular modems 112 and 113 of remote wireless adapter 110.

FIG. 2 shows a private network 200 that has multiple branches with network architecture as shown in FIG. 1. Branches of private network 200 may be connected through, for example, one or more virtual private networks (VPNs) through the Internet 150. As branches may be located at different locations, even different countries, that are covered by cellular signals from different wireless service providers, private network 200 needs to subscribe to multiple data plans (usually with limited data usage) from different wireless service providers for the failover connections of each branch. The wireless service providers may provide Subscriber Identity Module (SIM) cards for the data plans that are employed within private network 200. To activate a cellular data network connection with a wireless service provider, a SIM card from the wireless service provider should be inserted within a cellular modem and some parameters, e.g., a SIM pin, an access point name (APN) and user credentials, if needed, should be correctly configured and applied to the cellular modem. In order to avoid excessive wireless service charges, when the data allotment of a first SIM card from a first wireless service provider has been exhausted for a given billing cycle, a second SIM card associated with a second wireless service provider should be inserted into the cellular modem and the cellular modem should be configured again in order to activate the cellular data network of the second wireless service provider. If the first and second wireless service providers use different cellular networks, a firmware image of the second wireless service provider should also be flashed onto the cellular modem in order to enable usage of the cellular data network of the second wireless service provider using the second SIM card. For large private networks that use a large number of SIM cards from multiple wireless service providers spread across different geographies and time zones, such manual interventions like switching a SIM card, loading a matching modem firmware for a wireless carrier and configuring multiple cellular modems/SIM cards accordingly are tedious, error prone, inefficient, time consuming and very difficult to manage.

Therefore, there is a need for seamless management of modem firmware and configurations that can be applied to cellular modems of a network to accommodate SIM cards from different wireless service providers. There is also a need for provisioning the running of cellular modems and automatically switching between multiple SIM cards of the cellular modem to ensure that a wireless data network that provides best service is selected.

SUMMARY

Systems and methods are described for seamless provisioning and configuration of cellular modems of a private network by a provisioning server. A network device detects a SIM card inserted into a cellular modem of the network device and reads one or more properties of the SIM card from the SIM card. The network device sends the one or more properties of the SIM card to a provisioning server and receives configuration and matching modem firmware for the cellular modem from the provisioning server and flashes the firmware and then applies the configuration that matches the properties of the SIM card onto the cellular modem. The network device then activates a connection to a cellular data network through the cellular modem.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 10 illustrates an exemplary SIM card profile database in accordance with an embodiment of the present invention.

DETAILED DESCRIPTION

Figure 1:
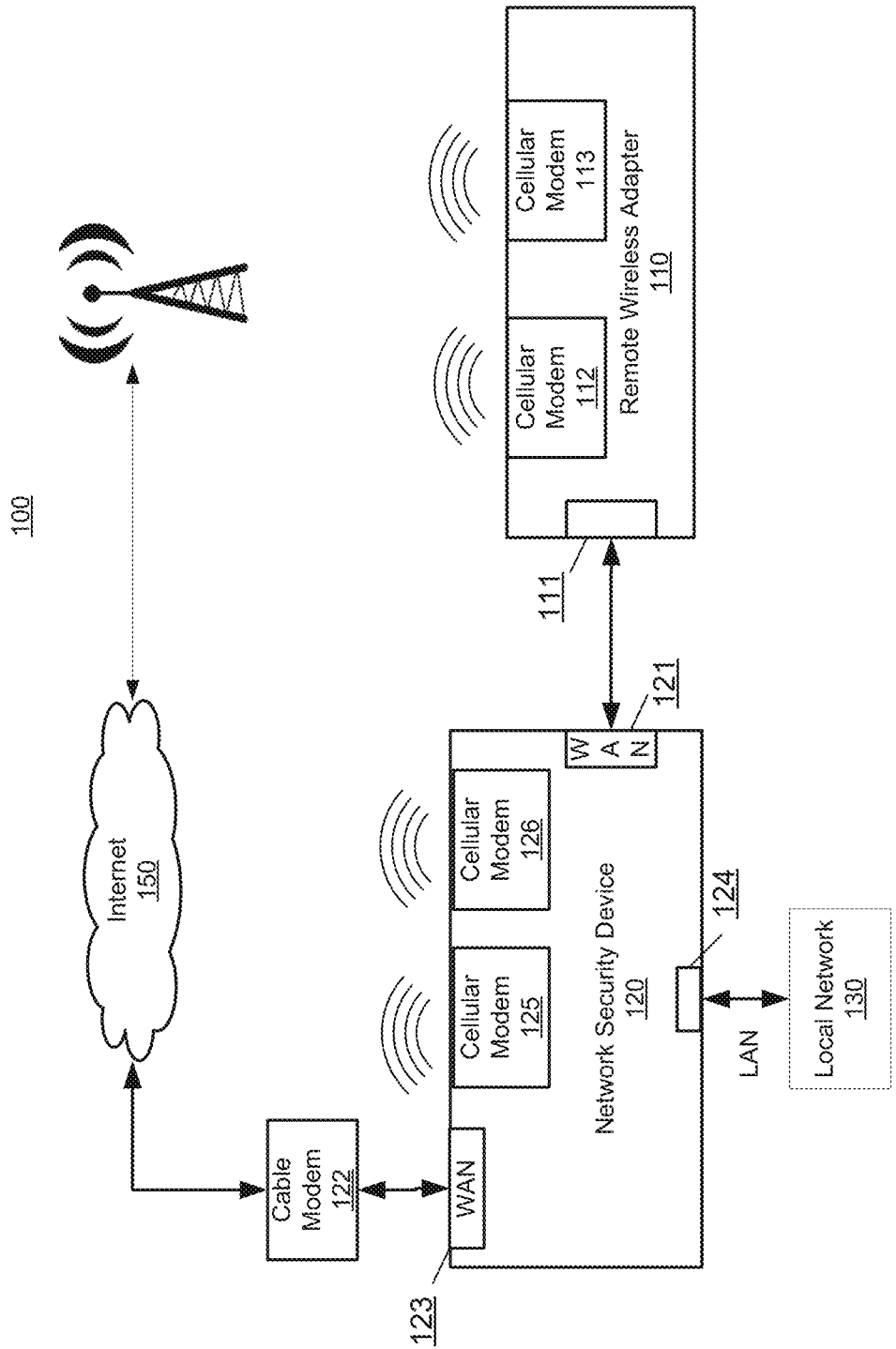
FIG. 1 illustrates a typical prior art network with cellular data network connections.

Systems and methods are described for seamless provisioning and configuration of cellular modems of a private network by a provisioning server. A network device detects the presence of a SIM card in a cellular modem of the network device and reads one or more properties (e.g., IMSI or ICCID) of the SIM card from the SIM card. The network device sends the one or more properties of the SIM card to a provisioning server, receives a corresponding configuration and/or firmware for the cellular modem from the provisioning server and applies the configuration or firmware or both that matches the properties of the SIM card to the cellular modem. The network device activates a connection to a cellular data network through the cellular modem.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The term "connection" generally refers to a TCP connection that is in-process, pending or active during any phase/stage, including, but not limited to during the 3-way handshake that establishes a TCP connection, during data transfer and/or prior to the conclusion of the formal 4-way TCP connection termination process.

If the specification states a component or feature "may", "can", "could", or "might" be included or have a characteristic, that particular component or feature is not required to be included or have the characteristic.

Figure 3:
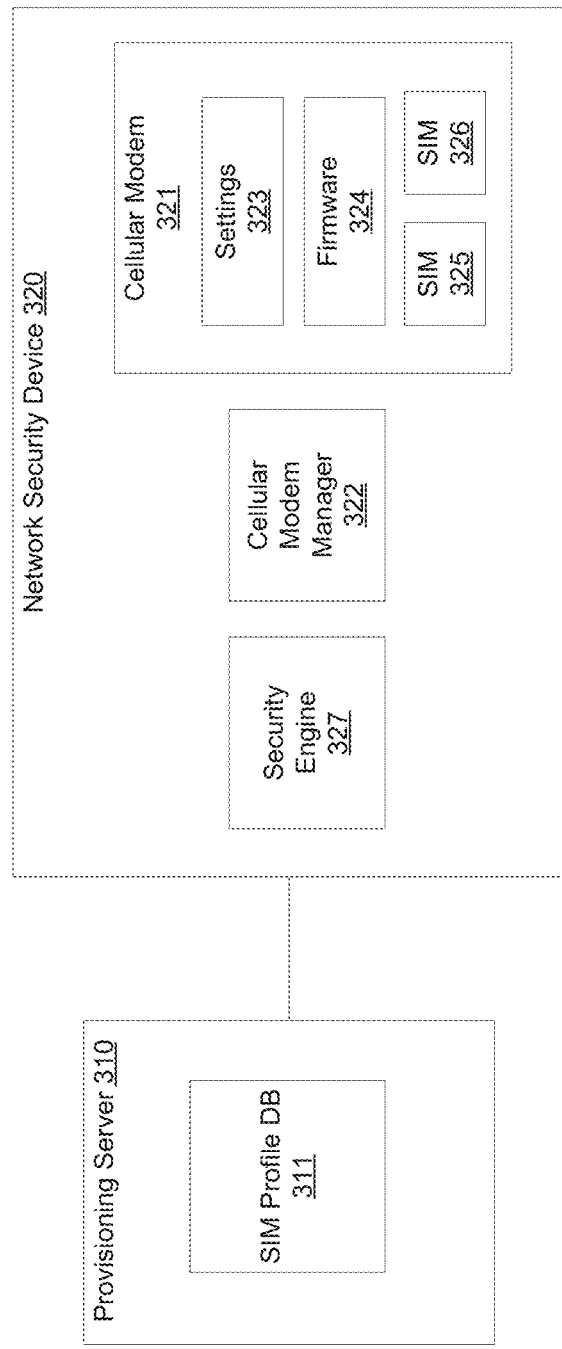
FIG. 3 is a block diagram illustrating functional units of a provisioning server that manage configuration and firmware of a cellular modem of a network security device in accordance with an embodiment of the present invention.

FIG. 3 is a block diagram illustrating functional units of a provisioning server 310 that manage configurations and various firmware images of a cellular modem 321 of a network security device 320 in accordance with an embodiment of the present invention. In FIG. 3, a private network 300 includes provisioning server 310 and network security device 320. Provisioning server 310 and network security device 320 may be operationally connected by a local area network (LAN), a wide area network (WAN) or the Internet.

Figure 2:
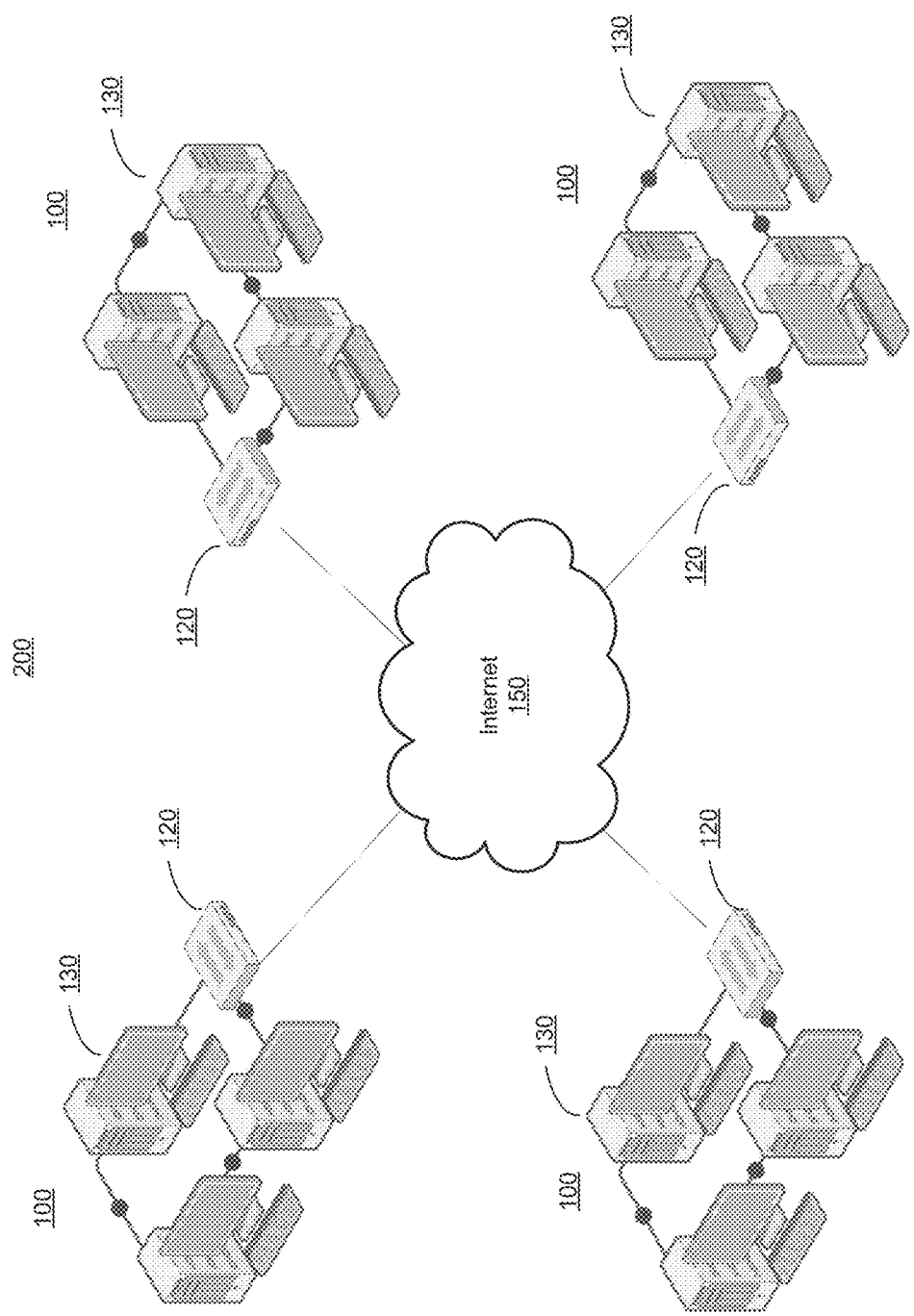
FIG. 2 illustrates a typical prior art network with multiple branches as shown in FIG. 1.

Private network 300 may have multiple branches (as shown in FIG. 2) that are located in different geographic regions and that may be covered by multiple cellular networks of multiple wireless service providers. For example, a first branch of private network 300 is located in San Jose, Calif. and has the best cellular signal strength from Verizon Wireless and weak signal strength from Sprint. A second branch of private network 300 is located in New York City, N.Y. and has the best signal strength from AT&T and weak signal strength from T-Mobile. A third branch of private network 300 is located in London that is covered by a wireless network from O2 and Vodafone. Therefore, private network 300 may subscribe to multiple data plans from these wireless service providers for the branches of private network 300. When data plans are purchased, SIM cards corresponding to these data plans are provided by the wireless service providers. If private network 300 needs to connect to a wireless data network of a wireless service provider, a corresponding SIM card of the wireless service provider should be used on the SIM card slot of a cellular modem and corresponding firmware of the wireless service provider should be flashed onto the cellular modem because these wireless service providers may use different cellular networks. In addition to flashing the matching modem firmware, the settings of the cellular modem and SIM card, e.g., an APN name and user credentials, if needed, may also be configured and applied in order to activate the cellular data network.

Provisioning server 310 is used for providing centralized management of configurations of cellular modems of the branches of private network 300 and providing recommended firmware and settings that are suitable for cellular modems and SIM cards. For example, properties of SIM cards from multiple wireless service providers that are employed within private network 300 may be collected and stored at SIM profile DB 311. Each SIM card has an Integrated Circuit Card ID (ICCID) that may be stored and printed on the SIM card. The ICCID is an identifier of the SIM chip itself. The format of the ICCID may be MMCC IINN NNNN NNNN NN C x where:
  MM=Constant (ISO 7812 Major Industry Identifier)
  CC=Country Code
  II=Issuer Identifier
  N{12}=Account ID ("SIM number")
  C=Checksum calculated from the other 19 digits using the Luhn algorithm.
  x=An extra 20th digit is returned by the 'AT!ICCID?' command, but it is not officially part of the ICCID.

Each SIM card stores information about a subscriber, e.g., an International Mobile Subscriber Identity (IMSI), that is a unique identifier of the subscriber. All signaling and messaging in GSM and UMTS networks use the IMSI as the primary identifier of the subscriber. An IMSI has the format MCC-MNC-MSIN, where MCC=Mobile Country Code, MNC=Mobile Network Code and MSIN=sequential serial number.

The wireless service provider of a SIM card may be identified from the MCC and MNC of the IMSI.

Firmware images for the cellular modems provided by all wireless service providers are collected and stored within SIM profile DB 311. Settings of the cellular modems and SIM cards that are required for activating the cellular data networks are also collected and managed by SIM profile DB 311. The settings of cellular modems and SIM cards may include, but are not limited to, APN names, user credentials, if needed, and signal strength related parameters. Properties of cellular modems of private network 300, e.g., an International Mobile Equipment Identity (IMEI), that uniquely identifies a cellular modem may also be collected by provisioning server 310. Provisioning server 310 may find a correct firmware image and associated settings for activating a cellular modem and a SIM card based on the ICCID or IMSI of the SIM card. If a ICCID or IMSI cannot be found within SIM profile DB 311, the wireless service provider of the SIM card may be determined based on the MCC and MNC of the IMSI of the SIM card. In this manner, a recommended firmware image and settings for the wireless service provider of the SIM card may be provided by provisioning server 310 to network security device 320 for application to cellular modem and SIM cards 325 and 326.

Other information associated with SIM cards 325 and 326 of private network 300 may also be collected. For example, data plans, including data usage limits and billing cycles, of SIM cards may be input to SIM profile DB 311. Signal strength related parameters for each SIM card and/or cellular modem may also be measured and stored within SIM profile DB 311. This information may be used for monitoring and optimizing the operation of cellular modem 321 of private network 300. An example of SIM profile DB 311 and the various properties and parameters it may track for each SIM is illustrated by FIG. 10. It should be noted that provisioning server 310 may be either a standalone server or service deployed within private network 300 or provided via a cloud service provider. Provisioning server 310 may also be integrated within other network devices.

Network security device 320 includes a security engine 327 that is configured for separating the internal computing environment of private network 300 from the external computing environment, such as the Internet. Network security device 320 may intercept network traffic between the public network and private network 300 and may, among other things, scan for malware, viruses or high risk network accesses based on its security policies. The network traffic may be allowed or blocked based on the results of scanning.

Network security device 320 further includes a cellular modem 321 that is configured for providing network connectivity for private network 300 through a cellular data network of a wireless service provider. Cellular modem 321 has two SIM card slots that can accommodate two SIM cards 325 and 326. SIM cards 325 and 326 may be from different wireless service providers that may use different types of cellular networks. It should be noted that the current firmware of cellular modem 321 may not match the SIM card that is inserted into the SIM card slot. For example, cellular modem 321 may have been configured for using a cellular data network of Verizon Wireless, that is, a SIM card from Verizon Wireless may have been inserted and a firmware image of Verizon Wireless may have been flashed and settings for using Verizon Wireless may have been applied to cellular modem 321. When the current wireless link with Verizon Wireless network is lost, disrupted or becomes undesirable for some reason, e.g., out of data usage or weak signal strength, an administrator of private network 300 may wish to change the wireless link to AT&T. In doing so, a SIM card of AT&T may be inserted into a SIM card slot to replace the SIM card from Verizon Wireless. At this time, the current firmware does not match the newly inserted SIM card. In another example, two SIM cards 325 and 326 are both inserted into SIM card slots of cellular modem 321, but these SIM cards are from different wireless service providers that use different types of networks, for example, SIM card 325 is from Verizon Wireless and SIM card 326 is from AT&T. SIM card 325 is now activated and cellular modem 321 is flashed with a firmware image from Verizon Wireless. When the current wireless link with the Verizon Wireless network is lost, the administrator needs to activate the wireless link of AT&T using SIM card 326 or an automatic switchover can be triggered without manual intervention. In either of these cases, the SIM card 326 does not match with the current firmware within cellular modem 321. To address this mismatch between the SIM card to be switched over to and the firmware, cellular modem 321 needs to be flashed with a firmware image that matches with the current SIM card and is configured with the proper settings in order to activate the wireless link with the service provider.

A cellular modem manager 322 of network security device 320 is used to automatically configure cellular modem 321 to accommodate SIM cards that may be from different service providers. Network security device 320 also monitors the operation of cellular modem 321 and selects a cellular data network that provides the best network connectivity on behalf of private network 300. Cellular modem manager 322 may collect properties of cellular modem 321, including, but not limited to IMEI and current firmware version of cellular modem 321, and send information regarding these properties to provisioning server 310. When a SIM card 325 or 326 is inserted into a SIM card slot, information stored in SIM card 325 or 326 may be read out. The information of SIM card 325 and 326 may include, but is not limited to, ICCID and IMSI. Cellular modem manager 322 then sends the properties of inserted SIM card to provisioning server 310 and retrieves a recommended firmware image and corresponding settings for the SIM card from provisioning server 310. In other example, an identification of the wireless service provider of the SIM card may be extracted based on the ICCID or IMSI of the SIM card and sent to provision server 310 by cellular modem manager 322. A recommended firmware image and corresponding settings for wireless service provider may be retrieved from provisioning server 310. Cellular modem manager 322 then flashes the recommended firmware image, if necessary, on to cellular modem 321 and applies the corresponding settings retrieved from provisioning server 310 to cellular modem 321. The settings may include, but are not limited to, a SIM pin, an APN name and user credentials, if needed. After cellular modem 321 is flashed with the recommended firmware and configured with the corresponding settings, the firmware and settings are matched with the current SIM card and the wireless link with the wireless service provider of the current SIM card can be activated automatically without requiring manual intervention.

Cellular modem manager 322 may further monitor the operation of cellular modem 321 in order to maintain the best connectivity to private network 300. If a wireless link with the current service provider is lost, cellular modem manager 322 may check the reason for the loss of connectivity and resume the connectivity by changing to another data plan or another cellular data network. For example, cellular modem manager 322 may compare the current data usage with the data usage limit of the current SIM card to determine whether the current SIM card has exhausted its data usage for the current billing cycle. Cellular modem manager 322 may also compare the current signal strength related parameters of the cellular modem 321 with the recommended signal strength to determine whether the loss of connectivity is due to poor signal strength. Cellular modem manager 322 may notify the administrator about loss of connectivity or weak connectivity via the current wireless link and prompt the administrator to replace the current SIM card with a new SIM card to start a new wireless link, which may have better signal strength. In another example, multiple SIM cards, e.g., SIM cards 325 and 326, may have been inserted into cellular modem 321 and SIM card 325 is out of data usage. SIM card 326 may be automatically activated by cellular modem manager 322 to switch over from SIM card 325. The ICCID or IMSI of SIM card 326 is sent to provisioning server 310 by cellular modem manager 322 to retrieve a recommended firmware image and settings that are associated with SIM card 326. Cellular modem 321 is flashed with the retrieved firmware image and configured with the retrieved settings for SIM card 326. The wireless link to the service provider of SIM card 326 is then activated automatically without requiring any manual configuration.

Figure 4:
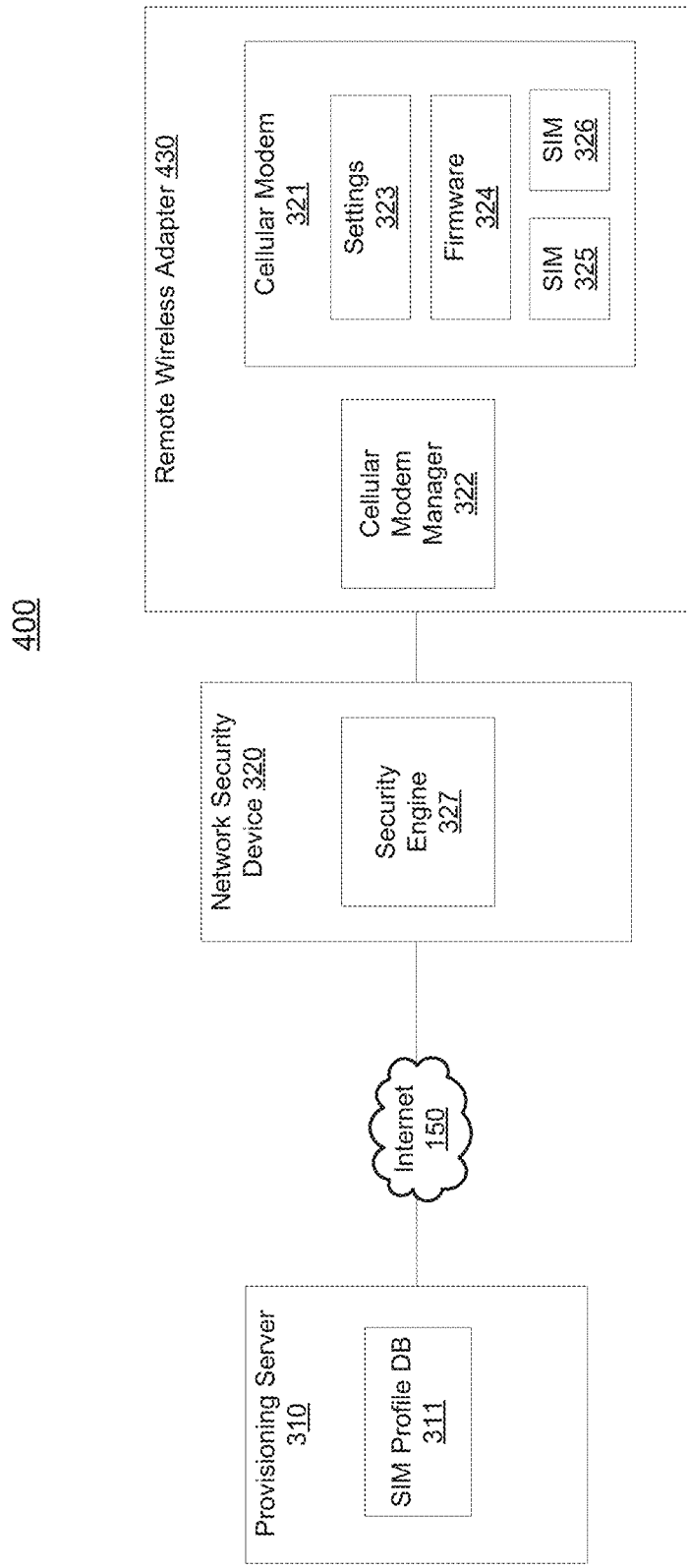
FIG. 4 is a block diagram illustrating functional units of a provisioning server that manage configuration and firmware of a cellular modem of a remote wireless adapter in accordance with another embodiment of the present invention.

FIG. 4 shows a network 400 that comprises a network security device 320 and a remote wireless adapter 430. Remote wireless adapter 430 may be connected to network security device 320 through a cable or network 400 in order that a cellular modem 321 of remote wireless adapter 430 can be placed at a location with better wireless signal strength. Cellular modem manager 322 may be implemented at remote wireless adapter 430 to manage the configurations and settings of cellular modem 321 and SIM cards 325 and 326. Provisioning server 310 may be a cloud-based service that provides recommended firmware and settings to multiple private networks based on ICCIDs or IMSIs of SIM cards and/or IMEIs of cellular modems. A private network may subscribe to services provided by the cloud-based provisioning service and send properties of SIM cards and cellular modems over the Internet 150 to retrieve the recommended firmware and settings for SIM cards and cellular modems from the cloud-based provisioning service.

Figure 5:
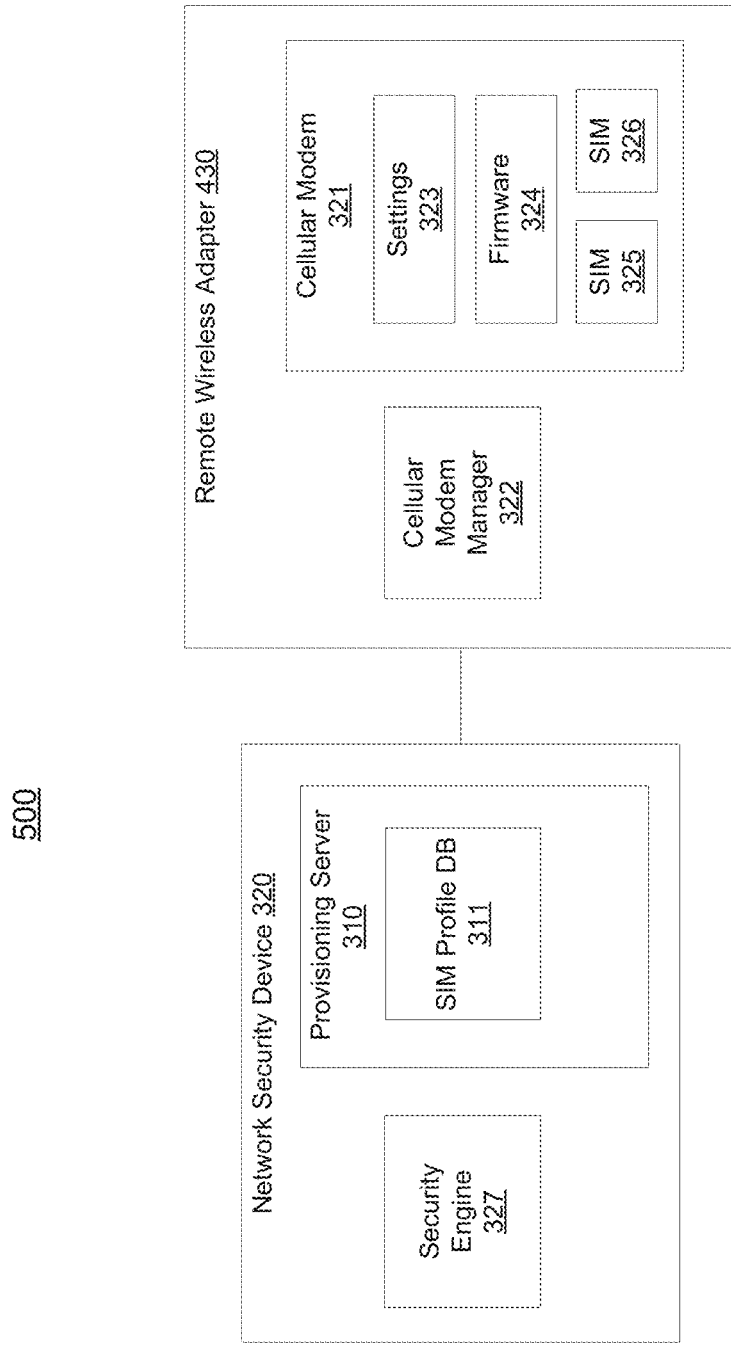
FIG. 5 is a block diagram illustrating functional units a provisioning server that manage configuration and firmware of a cellular modem of a remote wireless adapter in accordance with a further embodiment of the present invention.

FIG. 5 shows another network 500 where provisioning server 310 is implemented as a module of network security device 320. Network security device 320 may provide recommended firmware and settings to one or more remote wireless adapters of network 500.

Figure 6:
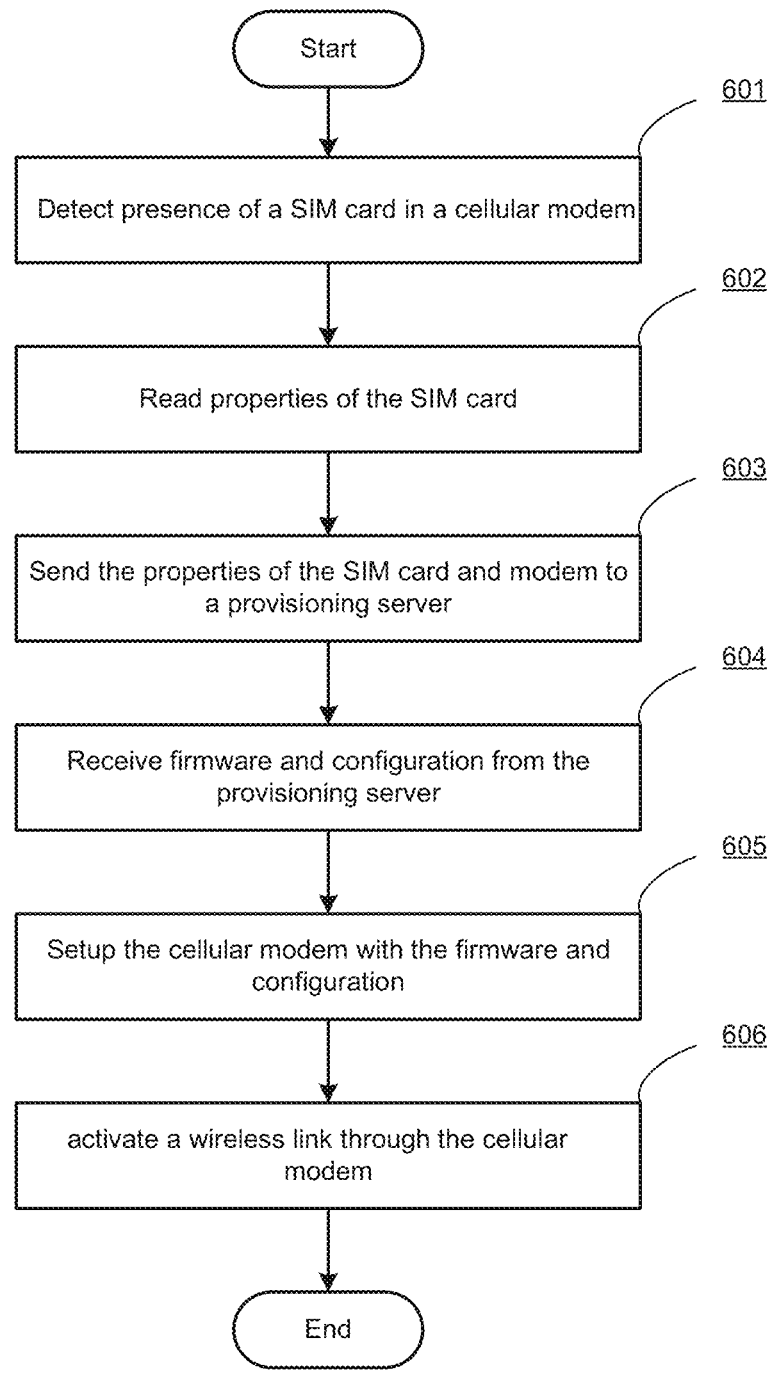
FIG. 6 is a flow diagram illustrating a method for initializing configurations of a cellular modem of a network security device in accordance with an embodiment of the present invention.

FIG. 6 is a flow diagram illustrating a method for automatically initializing configuration and firmware of a cellular modem of a network security device in accordance with an embodiment of the present invention.

At block 601, a cellular modem manager that manages a cellular modem of a network device detects the presence of a SIM card (e.g., insertion of the SIM) within a SIM card slot of the cellular modem. In one example, the cellular modem is integrated within a network security device to provide a failover or primary Internet connection to a private network protected by the network security device. The cellular modem manager is a module of the network security device and is used for managing various configurations of the cellular modem. In other example, the cellular modem is integrated with a remote wireless adapter that is connected to a network security device and that provides a failover or primary Internet connection on behalf of the private network. To the extent the network security device is located in a physical location that does not have good wireless coverage, the remote wireless adapter can be placed at a location remote from the network security device that has better wireless signals. The cellular modem manager is a module of the remote wireless adapter and is used for managing the configurations of the cellular modem.

At block 602, the cellular modem manager reads out an identification of the SIM card and other information stored in the SIM card. The identification of the SIM card may be the ICCID or IMSI that is stored in the SIM card. It should be noted that information stored in the SIM card can be read out despite the fact that the current firmware of the cellular modem may not match with the SIM card.

At block 603, the cellular modem may send the identification of the SIM card as well as the identification (e.g., the IMEI) of the cellular modem to a provisioning server. The provisioning server may be implemented in a number of ways, including as a standalone server within the private network, as a module of a network security device or within an access point controller (AC). If the cellular modem manager is connected to the provisioning server across a public network, a secure tunnel may be established and data packets exchanged between the cellular modem manager and the provisioning server may be encrypted in order to avoid eavesdropping by a third party. Exemplary tunneling protocols include, but are not limited to Control And Provisioning of Wireless Access Points (CAPWAP), Datagram Transport Layer Security (DTLS), Secure Socket Layer (SSL), secure shell (SSH) or even proprietary protocols. The provisioning server may check the identifications of the SIM card and the cellular modem and find a recommended firmware image for the SIM card and cellular modem and corresponding settings that have been configured by the administrator of the private network. The recommended firmware image and settings may be pushed back to the cellular modem manager or downloaded by the cellular modem manager. The operations of provisioning server are described further below with reference to FIG. 8.

At block 604, the cellular modem manager receives or downloads the recommended firmware image and settings from the provisioning server. The recommended firmware image comprises firmware that matches the current SIM card and that is provided by the service provider of the current SIM card for driving the cellular modem hardware. The settings, including a SIM pin, an APN name and/or user credentials, if needed, are set up by the administrator of the private network for the cellular modem to connect to the cellular data network of the service provider.

At block 605, the cellular modem manager flashes the recommended firmware image on to the cellular modem and applies the retrieved settings to the cellular modem.

At block 606, the cellular modem automatically activates the cellular modem with the flashed firmware image and the settings that match with the current SIM card. In one example, the cellular modem and the SIM card support hand free activation, the cellular modem may automatically activate the wireless link with the wireless service provide after the recommended firmware image is flashed onto the cellular modem. In another example, if the cellular modem and the SIM card do not support hand free activation or a private APN of the private network is to be used, the cellular modem may activate the wireless link with the wireless service provider using the settings, which include the user credentials and private APN name, retrieved from the provisioning server in order to access the private APN services.

Figure 7:
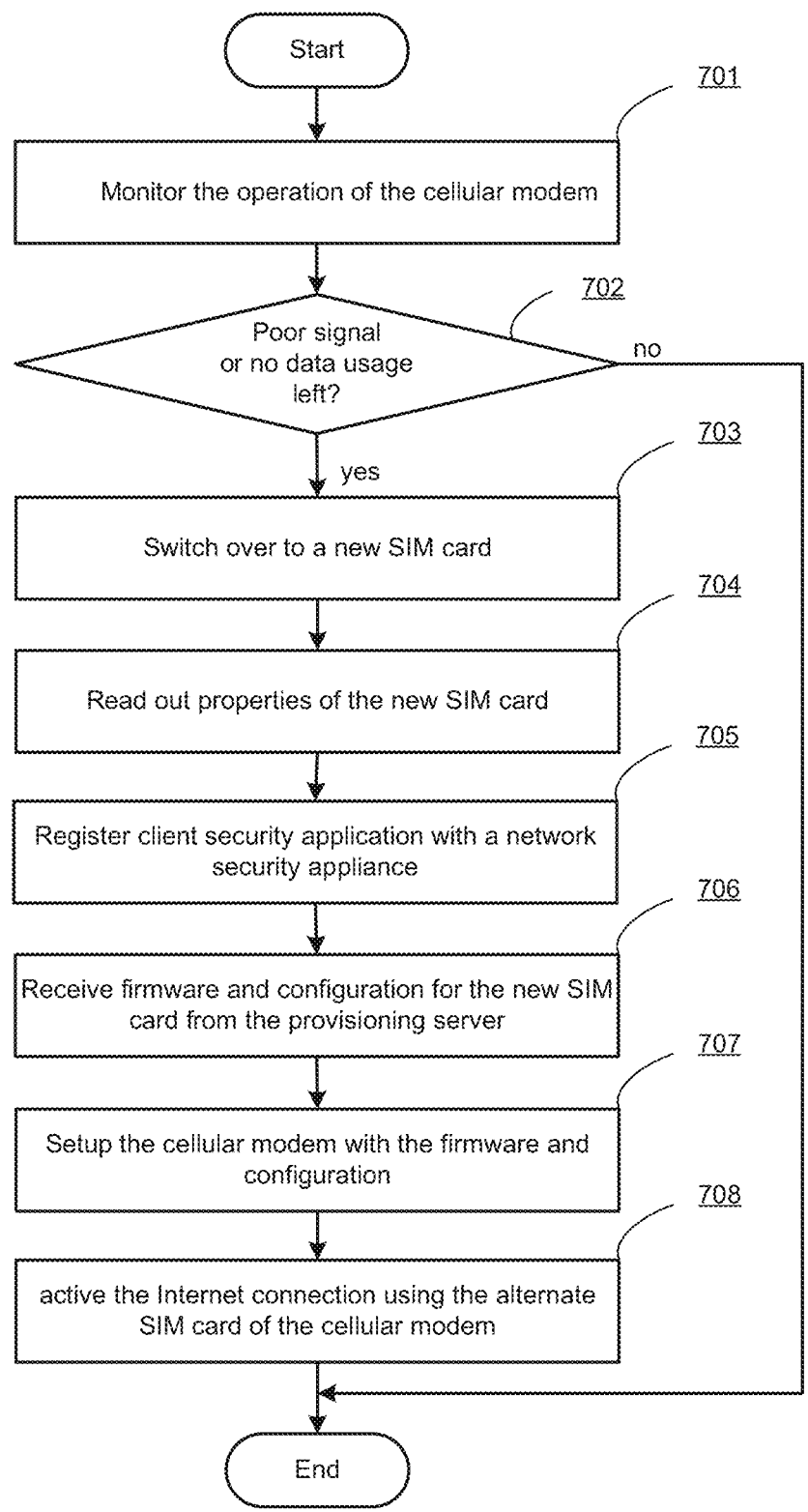
FIG. 7 is a flow diagram illustrating a method for managing configurations of a cellular modem of a network security device on the fly in accordance with an embodiment of the present invention.

FIG. 7 is a flow diagram illustrating a method for managing configurations of a cellular modem of a network security device on the fly in accordance with an embodiment of the present invention.

At block 701, a cellular modem manager monitors the operation of a cellular modem. For example, the data usage and wireless signal quality of the cellular modem may be monitored in real-time by the cellular modem manager. The wireless signal quality may be measured by, for example, signal to interference plus noise ratio (SINR), reference signal received power (RSRP), received signal strength indication (RSSI) and reference signal received quality (RSRQ).

At block 702, the cellular modem manager may determine whether the cellular modem has a poor wireless signal or has run out of data usage for the current billing cycle. The data usage limit of the SIM card for the current billing cycle may be recorded within a provisioning server and retrieved by the cellular modem manager from the provisioning server. The current data usage of the current SIM card may be compared with its data usage limit to determine whether the current wireless link is to be closed by the wireless service provider because no data usage remains for the present billing cycle. The cellular modem manager monitors may also compare one or more of SINR, RSRP, RSSI and RSRQ, or a combination of these parameters with standard values of these parameters that may be retrieved from the provisioning server to determine whether the current wireless link is lost or weak due to poor signal strength. When it is determined that the current wireless link is lost or too weak to be used, processing continues with block 703.

At block 703, the SIM card of cellular modem is switched to a new SIM card. If the cellular modem has only one SIM card slot, the current SIM card is replaced with a new SIM card. If the cellular modem has multiple SIM card slots and multiple SIM cards have been installed within the SIM card slots, a new SIM card may be automatically selected by the cellular modem manager.

At blocks 704-708, the ICCID or IMSI of the new SIM card may be read out and sent to the provisioning server by the cellular modem manager. The recommended firmware image for the new SIM card may be retrieved from the provisioning server and flashed onto the cellular modem. Settings for the new SIM card are also retrieved from the provisioning server and applied to the cellular modem. The cellular modem is then automatically activated with the new SIM card using the correct firmware and settings by the cellular modem manager. The operations of blocks 704-708 are the same as that of block 602-606 and further description thereof is omitted.

Figure 8:
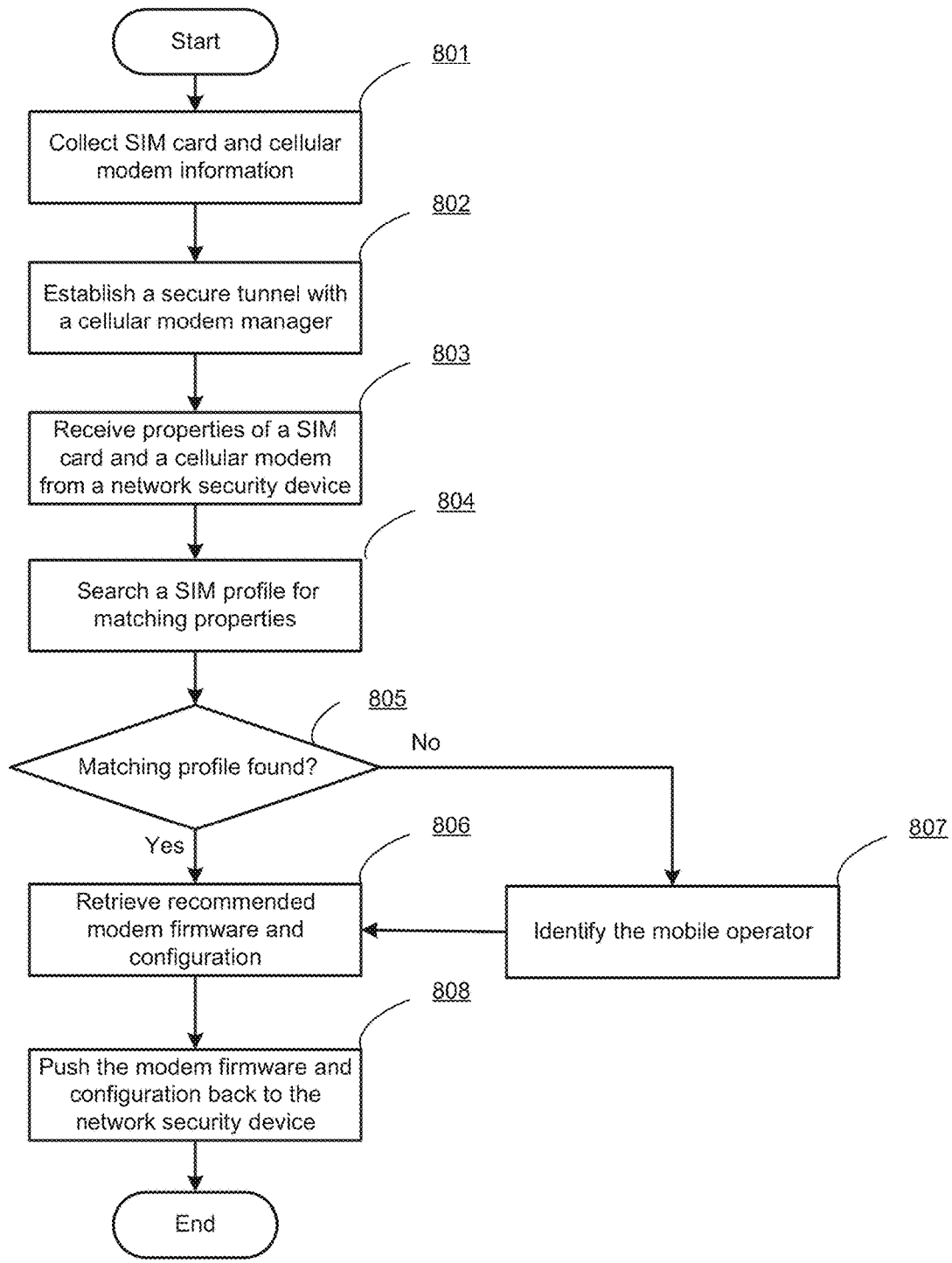
FIG. 8 is a flow diagram illustrating a method for provisioning SIM cards and configurations of a cellular modem of a network security device by a provisioning server in accordance with an embodiment of the present invention.

FIG. 8 is a flow diagram illustrating a method for provisioning SIM cards and configurations of a cellular modem of a network security device by a provisioning server in accordance with an embodiment of the present invention.

At block 801, a provisioning server collects information of SIM cards and cellular modems of a private network. The information of SIM cards may include ICCIDs or IMSIs of SIM cards that are being used or will be used by the private network. Information of cellular modems of the private network may include IMEIs and firmware images of the cellular modems for supporting different wireless service providers. User credentials may be created for SIM cards requiring the authentication details. As shown in FIG. 10, a profile for each SIM card may be created and the profile may include recommended firmware image and corresponding settings that can be used by a SIM card and a cellular modem for driving the cellular modem hardware to activate a wireless link with the wireless service provider associated with the SIM card. The profile may also include data plan information, including, but not limited to, a data limit for a billing cycle of the SIM card. One or more signal strength related parameters for the SIM card and the cellular modem may also be sampled and periodically stored in a SIM card profile. A SIM card and cellular modem profile database may be created by the provisioning server to store the profiles of the SIM cards and cellular modems of the private network. Optionally, profiles for wireless service providers that can be identified from the MCCs and MNCs of IMSIs may be created and stored within the SIM card and cellular modem profile database. The profiles for wireless service providers may include recommended firmware images and settings for each of the wireless service providers.

At block 802, a secure tunnel may be established between the provisioning server and a cellular modem manager of a network security device or a remote wireless adapter so as to protect the data packets transmitted there between from eavesdropping by a third party.

At block 803, the provisioning server receives properties of a SIM card and a cellular modem, such as ICCID or IMSI and IMEI, from the cellular modem manager. The properties of the SIM card is read out by the cellular modem manager when the SIM card is inserted into a SIM card slot of the cellular modem.

At block 804, the provisioning server may search the SIM card and cellular modem profile database for a profile that matches the ICCID/IMSI and IMEI.

At block 805, the provisioning server determines whether a profile that matches the SIM card exists within the SIM card and cellular modem profile database. When a matching profile is found, the recommended firmware image and settings are retrieved from the matching profile at block 806. If no matching profile is found at block 805, the provisioning server may identify the wireless service provider of the SIM card based on the IMSI at block 807 and a recommended firmware image and settings which can be default at times for the wireless service provider are retrieved at block 806.

At block 807, the recommended firmware image and settings for the SIM card and the cellular modem is pushed back to the cellular modem manager for provisioning to be applied accordingly.

In another example, an identification of a wireless service provider of a SIM card may be received from the cellular modem manager and a profile of the wireless service provider may be searched by the provisioning server. If the profile of the wireless service provider is found, the recommended firmware image and settings of the wireless service provider may be retrieved and sent back to the cellular modem manager.

Figure 9:
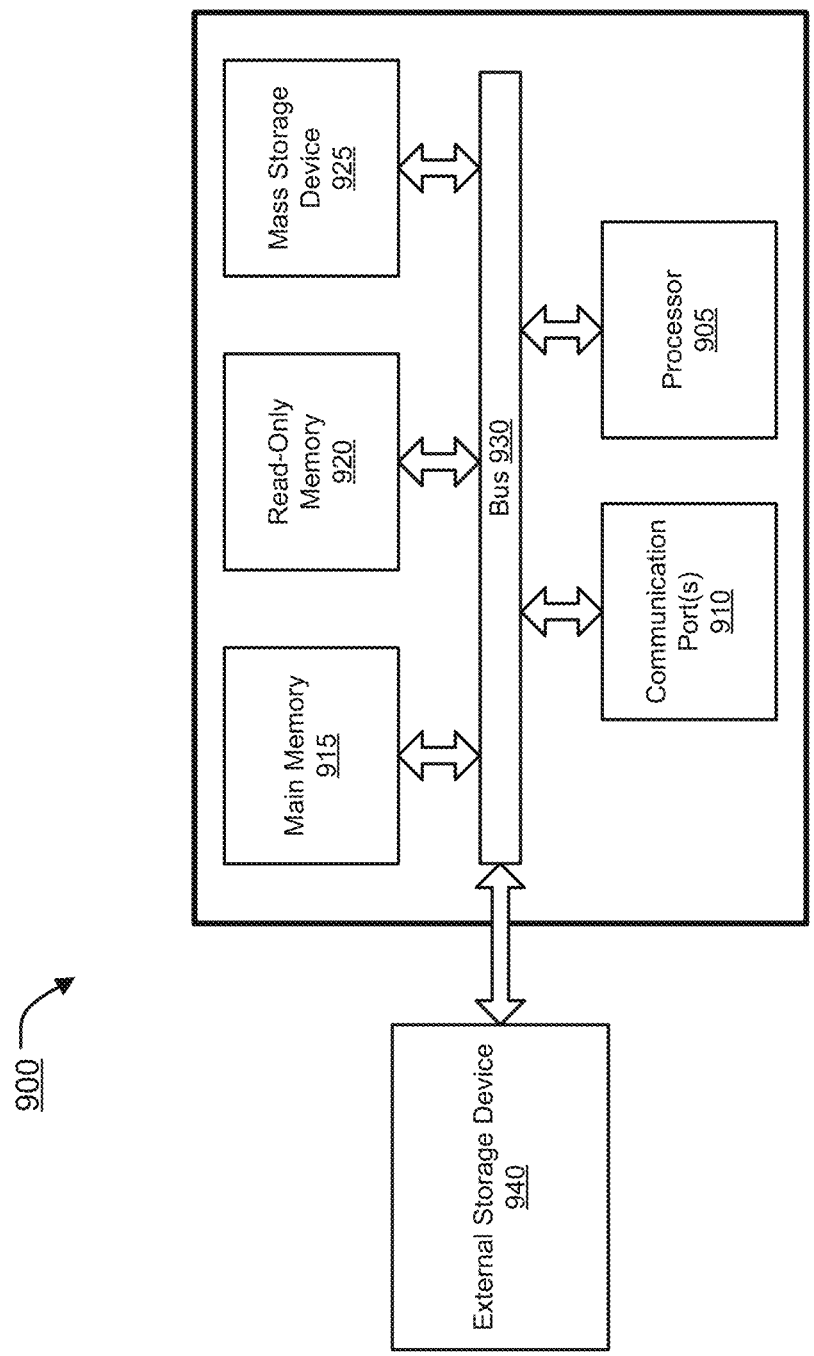
FIG. 9 illustrates an exemplary computer system in which or with which embodiments of the present invention may be utilized.

FIG. 9 is an example of a computer system 900 with which embodiments of the present disclosure may be utilized. Computer system 900 may represent or form a part of a provisioning server, a network security device, a network appliance, a remote wireless adapter, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, a processor 905, communication port 910, a main memory 915, a removable storage media 940, a read only memory 920 and a mass storage 925. A person skilled in the art will appreciate that computer system 900 may include more than one processor and communication ports.

Examples of processor 905 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 905 may include various modules associated with embodiments of the present invention.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910.

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

An example of SIM profile DB 311 and the various properties and parameters it may track for each SIM within a private network is illustrated by FIG. 10.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
detecting, by a network device, presence of a Subscriber Identity Module (SIM) card within a cellular modem of the network device, wherein the network device provides network connectivity to a private network;
reading, by the network device, one or more properties of the SIM card;
sending, by the network device, information regarding the one or more properties to a provisioning server that manages information regarding configurations of SIM cards and cellular modems of the private network;
receiving, by the network device, a configuration to be applied to the cellular modem from the provisioning server, wherein the configuration matches the one or more properties of the SIM card;
applying, by the network device, the configuration to the cellular modem;
activating, by the network device, a connection to a cellular data network through the cellular modem;
monitoring, by the network device, the connection;
determining, by the network device, whether the connection to the cellular data network is lost or weak;
when said determining is affirmative, then:
sending, by the network device, one or more properties of an alternate SIM card of the cellular modem to the provisioning server;
retrieving from the provisioning server, by the network device, a second configuration to be applied to the cellular modem that matches the one or more properties of the alternate SIM card;
applying, by the network device, the second configuration to the cellular modem; and
activating, by the network device, a second connection to a second cellular data network through the cellular modem.

2. The method of claim 1, wherein the one or more properties of the SIM card include an integrated circuit card identifier (ICCID) and International Mobile Subscriber Identity (IMSI).

3. The method of claim 1, wherein said sending, by the network device, the one or more properties of the SIM card to a provisioning server further comprises sending, by the network device, one or more properties of the cellular modem to the provisioning server.

4. The method of claim 1, wherein said configuration includes one or more of:
a recommended firmware for the cellular modem;
a SIM pin;
an access point name (APN);
user credentials;
a data plan of the SIM; and
signal strength related parameters.

5. The method of claim 1, wherein said determining, by the network device, whether the connection to the cellular data network is lost or weak further comprises:
retrieving, by the network device, one or more signal strength related parameters from the cellular modem; and
comparing, by the network device, the one or more signal strength related parameters with one or more signal strength related standards of the cellular modem.

6. The method of claim 1, wherein said determining, by the network device, whether the connection to the cellular data network is lost or weak further comprises:
retrieving, by the network device, from the provisioning server an amount of data used by the SIM card during a current billing cycle; and
comparing, by the network device, the amount of data used to a data allotment for the current billing cycle.

7. A network device comprising:
a non-transitory storage device having embodied therein instructions representing a cellular modem management application; and
one or more processors coupled to the non-transitory storage device and operable to execute the cellular modem management application to perform a method comprising:
detecting presence of a Subscriber Identity Module (SIM) card within a cellular modem of the network device, wherein the network device provides network connectivity to a private network;
reading one or more properties of the SIM card;
sending information regarding the one or more properties to a provisioning server that manages information regarding configurations of SIM cards and cellular modems of the private network;
receiving a configuration to be applied to the cellular modem from the provisioning server, wherein the configuration matches the one or more properties of the SIM card;
applying the configuration to the cellular modem;
activating a connection to a cellular data network through the cellular modem;
monitoring the connection;
determining whether the connection to the cellular data network is lost or weak;
when said determining is affirmative, then:
sending one or more properties of an alternate SIM card of the cellular modem to the provisioning server;
retrieving from the provisioning server a second configuration to be applied to the cellular modem that matches the one or more properties of the alternate SIM card;
applying the second configuration to the cellular modem; and
activating a second connection to a second cellular data network through the cellular modem.

8. The network device of claim 7, wherein the one or more properties of the SIM card include an integrated circuit card identifier (ICCID) and International Mobile Subscriber Identity (IMSI).

9. The network device of claim 7, wherein said sending the one or more properties of the SIM card to a provisioning server further comprises sending, by the network device, one or more properties of the cellular modem to the provisioning server.

10. The network device of claim 8, wherein said configuration includes one or more of:
a recommended firmware for the cellular modem;
a SIM pin;
an access point name (APN);
user credentials;
a data plan of the SIM; and
signal strength related parameters.

11. The network device of claim 8, wherein said determining whether the connection to the cellular data network is lost or weak further comprises:
retrieving one or more signal strength related parameters from the cellular modem; and
comparing the one or more signal strength related parameters with one or more signal strength related standards of the cellular modem.

12. The network device of claim 8, wherein said determining whether the connection to the cellular data network is lost or weak further comprises:
retrieving from the provisioning server an amount of data used by the SIM card during a current billing cycle; and
comparing the amount of data used to a data allotment for the current billing cycle.

13. A method comprising:
detecting, by a network device, presence of a Subscriber Identity Module (SIM) card within a cellular modem of the network device, wherein the network device provides network connectivity to a private network;
reading, by the network device, one or more properties of the SIM card;
sending, by the network device, information regarding the one or more properties to a provisioning server that manages information regarding configurations of SIM cards and cellular modems of the private network;
receiving, by the network device, a configuration to be applied to the cellular modem from the provisioning server, wherein the configuration matches the one or more properties of the SIM card and wherein the configuration includes one or more of: (i) a recommended firmware for the cellular modem; (ii) a SIM pin; (iii) an access point name (APN); (iv) user credentials; (v) a data plan of the SIM; and (vi) signal strength related parameters;
applying, by the network device, the configuration to the cellular modem, including:
flashing the recommended firmware onto the cellular modem; and
applying to the cellular modem the APN and user credentials, if needed, received from the provisioning server; and
activating, by the network device, a connection to a cellular data network through the cellular modem.

14. The method of claim 13, wherein the one or more properties of the SIM card include an integrated circuit card identifier (ICCID) and International Mobile Subscriber Identity (IMSI).

15. The method of claim 13, wherein said sending, by the network device, the one or more properties of the SIM card to a provisioning server further comprises sending, by the network device, one or more properties of the cellular modem to the provisioning server.

16. The method of claim 13, further comprising:
monitoring, by the network device, the connection;
determining, by the network device, whether the connection to the cellular data network is lost or weak;
when said determining is affirmative, then:
sending, by the network device, one or more properties of an alternate SIM card of the cellular modem to the provisioning server;
retrieving from the provisioning server, by the network device, a second configuration to be applied to the cellular modem that matches the one or more properties of the alternate SIM card;
applying, by the network device, the second configuration to the cellular modem; and
activating, by the network device, a second connection to a second cellular data network through the cellular modem.

17. The method of claim 16, wherein said determining, by the network device, whether the connection to the cellular data network is lost or weak further comprises:
retrieving, by the network device, one or more signal strength related parameters from the cellular modem; and
comparing, by the network device, the one or more signal strength related parameters with one or more signal strength related standards of the cellular modem.

18. The method of claim 16, wherein said determining, by the network device, whether the connection to the cellular data network is lost or weak further comprises:
retrieving, by the network device, from the provisioning server an amount of data used by the SIM card during a current billing cycle; and
comparing, by the network device, the amount of data used to a data allotment for the current billing cycle.

19. A network device comprising:
a non-transitory storage device having embodied therein instructions representing a cellular modem management application; and
one or more processors coupled to the non-transitory storage device and operable to execute the cellular modem management application to perform a method comprising:
detecting presence of a Subscriber Identity Module (SIM) card within a cellular modem of the network device, wherein the network device provides network connectivity to a private network;
reading one or more properties of the SIM card;
sending information regarding the one or more properties to a provisioning server that manages information regarding configurations of SIM cards and cellular modems of the private network;
receiving a configuration to be applied to the cellular modem from the provisioning server, wherein the configuration matches the one or more properties of the SIM card and wherein the configuration includes one or more of: (i) a recommended firmware for the cellular modem; (ii) a SIM pin; (iii) an access point name (APN); (iv) user credentials; (v) a data plan of the SIM; and (vi) signal strength related parameters;
applying the configuration to the cellular modem, including:
flashing the recommended firmware onto the cellular modem; and applying to the cellular modem the APN and user credentials, if needed, received from the provisioning server; and activating a connection to a cellular data network through the cellular modem.

20. The network device of claim 19, wherein the one or more properties of the SIM card include an integrated circuit card identifier (ICCID) and International Mobile Subscriber Identity (IMSI).

21. The network device of claim 19, wherein said sending the one or more properties of the SIM card to a provisioning server further comprises sending, by the network device, one or more properties of the cellular modem to the provisioning server.

22. The network device of claim 19, wherein the method further comprises:

monitoring the connection;

determining whether the connection to the cellular data network is lost or weak;

when said determining is affirmative, then:

sending one or more properties of an alternate SIM card of the cellular modem to the provisioning server;

retrieving from the provisioning server a second configuration to be applied to the cellular modem that matches the one or more properties of the alternate SIM card;

applying the second configuration to the cellular modem; and activating a second connection to a second cellular data network through the cellular modem.

23. The network device of claim 22, wherein said determining whether the connection to the cellular data network is lost or weak further comprises:

retrieving one or more signal strength related parameters from the cellular modem; and comparing the one or more signal strength related parameters with one or more signal strength related standards of the cellular modem.

24. The network device of claim 22, wherein said determining whether the connection to the cellular data network is lost or weak further comprises:

retrieving from the provisioning server an amount of data used by the SIM card during a current billing cycle; and comparing the amount of data used to a data allotment for the current billing cycle.

* * * * *